United States Patent
Madau et al.

(10) Patent No.: US 10,277,837 B2
(45) Date of Patent: Apr. 30, 2019

(54) SYSTEM AND METHOD FOR MONITORING A DRIVER OF A VEHICLE

(71) Applicants: Dinu Petre Madau, Canton, MI (US); Matthew Mark Mikolajczak, Novi, MI (US); Paul Morris, Ann Arbor, MI (US)

(72) Inventors: Dinu Petre Madau, Canton, MI (US); Matthew Mark Mikolajczak, Novi, MI (US); Paul Morris, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 748 days.

(21) Appl. No.: 14/071,931

(22) Filed: Nov. 5, 2013

(65) Prior Publication Data
US 2015/0124068 A1 May 7, 2015

(51) Int. Cl.
| | |
|---|---|
| H04N 5/33 | (2006.01) |
| B60K 28/02 | (2006.01) |
| G08B 21/06 | (2006.01) |
| G06K 9/00 | (2006.01) |
| G06K 9/20 | (2006.01) |
| H04N 7/18 | (2006.01) |

(52) U.S. Cl.
CPC ............... *H04N 5/33* (2013.01); *B60K 28/02* (2013.01); *G06K 9/00845* (2013.01); *G06K 9/209* (2013.01); *G08B 21/06* (2013.01); *H04N 7/183* (2013.01); *Y10T 29/49826* (2015.01)

(58) Field of Classification Search
CPC .... Y10T 29/49826; H04N 7/183; H04N 5/33; B06K 28/02; G06K 9/00845; G06K 9/209; G08B 21/06
See application file for complete search history.

(56) References Cited

U.S. PATENT DOCUMENTS

| | | | | |
|---|---|---|---|---|
| 5,040,116 A | * | 8/1991 | Evans, Jr. | G01S 17/936 |
| | | | | 180/169 |
| 5,305,012 A | * | 4/1994 | Faris | A61F 9/023 |
| | | | | 345/7 |
| 5,671,035 A | * | 9/1997 | Barnes | G02C 7/104 |
| | | | | 351/158 |
| 5,714,751 A | * | 2/1998 | Chen | G01S 3/7864 |
| | | | | 250/203.4 |
| 6,244,703 B1 | * | 6/2001 | Resnikoff | G02C 7/101 |
| | | | | 351/44 |
| 6,324,453 B1 | * | 11/2001 | Breed | B60N 2/0232 |
| | | | | 180/169 |

(Continued)

FOREIGN PATENT DOCUMENTS

EP    1167126 A2    1/2002

*Primary Examiner* — Nhon T Diep
(74) *Attorney, Agent, or Firm* — Dickinson Wright PLLC

(57) ABSTRACT

A system for monitoring a driver of a vehicle is provided. The system includes an infrared flash to beam an infrared light at the driver; an infrared camera to capture the reflection from the beam; and a reflective infrared film adhered to a windshield of the vehicle. A method for implementing a driver monitoring system is provided. The method includes installation of an infrared reflective layer on a vehicle; installing an infrared camera and an infrared flash in a dashboard of the vehicle; and orientating either the infrared camera or the infrared flash in a direction facing the infrared reflective layer.

15 Claims, 3 Drawing Sheets

Option 3: Flash - to - Reflector - to - Face to - Reflector - to - Camera

(56) References Cited

U.S. PATENT DOCUMENTS

| | | | | |
|---|---|---|---|---|
| 6,393,133 B1* | 5/2002 | Breed | ............... | G01F 23/20 |
| | | | | 280/735 |
| 7,199,767 B2* | 4/2007 | Spero | ............... | G02B 5/20 |
| | | | | 250/203.4 |
| 2009/0072118 A1* | 3/2009 | Zheng | ............... | B60R 11/0258 |
| | | | | 248/683 |
| 2010/0251804 A1* | 10/2010 | Morley | ............... | B60K 28/063 |
| | | | | 73/23.3 |
| 2012/0150387 A1* | 6/2012 | Watson | ............... | A61B 5/0077 |
| | | | | 701/36 |
| 2012/0215403 A1* | 8/2012 | Tengler | ............... | B60W 50/12 |
| | | | | 701/36 |
| 2014/0205143 A1* | 7/2014 | Zhang | ............... | G06K 9/00845 |
| | | | | 382/103 |
| 2015/0358471 A1* | 12/2015 | Roth | ............... | B60K 37/00 |
| | | | | 455/417 |

* cited by examiner

Current 'direct' (non-reflected) method:
Flash - to - Face - to - Camera

Option 1: Flash - to - Face - to -
Reflector - to - Camera

Option 2: Flash - to - Reflector - to - Face - to - Camera

Option 3: Flash - to - Reflector - to - Face to - Reflector - to - Camera

SYSTEM AND METHOD FOR MONITORING A DRIVER OF A VEHICLE

BACKGROUND

When operating a vehicle, a common problem is driver alertness. During a long road trip, the driver may succumb to wariness, and fall asleep or not be alert. An end result of this is that the driver may crash or not operate the vehicle in a safe manner.

Various techniques have been implemented to ensure the driver is alert. For example, a stereo in a vehicle's dashboard may alert an alarm at a predetermined time, and instigate the driver to assert a button or command. By engaging the driver at a predetermined time interval, the driver is encouraged to be alert.

In the above example, the driver is required to physically take action. The driver may be annoyed or burdened by this active process. Thus, the driver may disable the alarm, thereby frustrating the purpose of the alarm.

In another example, a camera may be situated in the vehicle. However, due to pre designs of vehicle areas, finding a location that is not unsightly may be difficult. Further, because cameras often times need light, this technique may not be effective during nighttime driving.

DESCRIPTION OF THE DRAWINGS

The detailed description refers to the following drawings, in which like numerals refer to like items, and in which.

DETAILED DESCRIPTION

Figure 1:
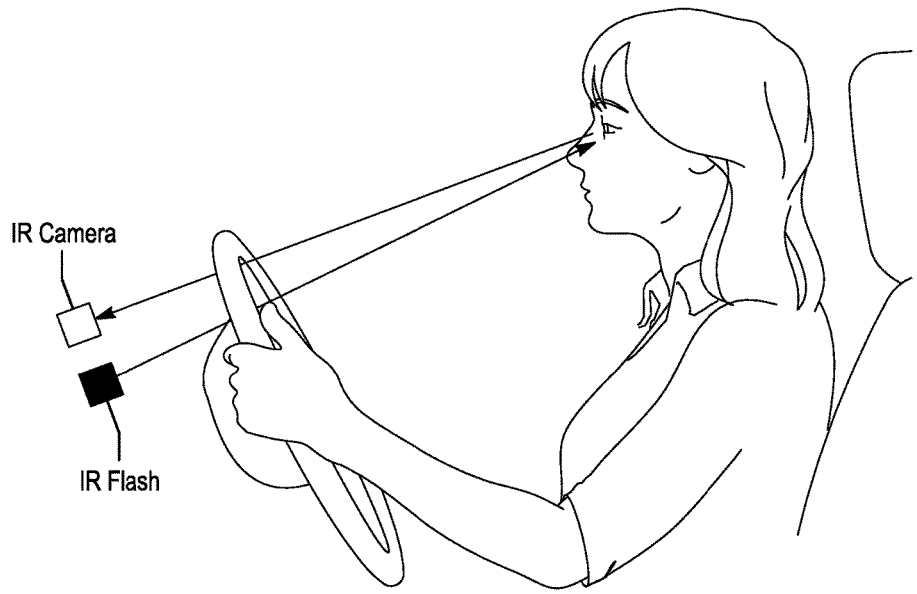
FIG. 1 is an example of a system for monitoring a driver of a vehicle.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Monitoring a driver of a vehicle may provide various benefits. For example, the driver's facial features may be analyzed to ensure the driver is alert. Often times, when a driver is about to sleep or loses alertness, the driver's eyes will close. In other examples, the drive may lean down in a slouched position.

Thus, the vehicle may incorporate a camera embedded in a portion of the vehicle. The camera may be oriented in or around the direction of the driver or the driver's face, and thus, be able to capture various indications that may alert a system that the driver is either asleep or not alert.

In addition to monitoring the alertness of the driver, the camera may also be employed as an input device. Thus, by detecting motion or gestures, the camera may relay the motion to a central processor, and cause an action or command to occur.

The camera may be situated in a dashboard, or a location behind a steering wheel (i.e. a dashboard). The dashboard location may be chosen due to the ability to hide circuitry or other components associated with the camera. Also, due to the fact that driver is situated behind the steering wheel, the dashboard allows the camera to be oriented in a fashion to directly view the driver.

However, if the camera is situated in the dashboard, the steering wheel may obstruct the camera's view of the driver. Thus, the ability to obtain a clear image or video of the driver is frustrated.

Further, many cameras operate in lighted situations. However, the vehicle may be operated at nighttime or in a relatively dark situation. Thus, many cameras may not be able to capture an image or video during nighttime or dark driving conditions.

Disclosed herein are systems and methods for monitoring a driver of a vehicle. The system disclosed herein employs a reflective layer placed on a windshield. The system also employs a flash and an infrared detector/camera. By employing various combinations of the above, the system achieves an aesthetically pleasing, convenient, and effective camera system to capture a driver's image while operating the vehicle.

Cameras can capture infrared images if an image sensor is employed that is sensitive to infrared light. The part of the spectrum used is referred to as near-infrared (NIR) to distinguish it from far-infrared, which includes thermal imaging.

Wavelengths used for NIR photography range from about 700 nm to about 1000 nm. Image sensors are usually sensitive to visible light too, so an infrared-passing filter is used. This lets infrared light pass through to the camera, but blocks all or most of the visible light spectrum (the filter thus looks black or deep red). ("Infrared filter" may refer either to this type of filter or to one that blocks infrared but passes other wavelengths).

The infrared camera may be used in conjunction with an infrared flash. The infrared flash may illuminate the object being photographed via the infrared camera. Thus, once the infrared flash beams an infrared light at the object, the infrared camera is capable of capturing the reflection caused by the infrared light.

The infrared flash may be situated in the dashboard of the vehicle. However, the implementers of the various systems and methods disclosed herein may situate the infrared flash in other portions of the vehicle.

FIG. 1 is an example of a system for monitoring a driver 100 of a vehicle. Referring to FIG. 1, a diagram of a front seat of the vehicle is depicted. The front seat shows a steering wheel 110, a dashboard 120, an infrared flash 130, and an infrared camera 140. The infrared flash 130 and the infrared camera 140 may be situated within the dashboard 120, or relatively near the dashboard 120. The infrared camera 140 may be attached to the dashboard 120 with an attachment unit (not shown), and may be adjustable so that a lens of the infrared camera 140 is oriented at different directions.

As shown in FIG. 1, the infrared flash 130 may beam an infrared beam 135 at the driver 100. In turn, a reflection 145 may be generated, and directed back at the infrared camera 140. Thus, based on the received reflection 145, the infrared camera is able to capture an image of the driver 100.

However, as shown in FIG. 1, the steering wheel 110 is in the path of both the beam 135 and the reflection 145. Due to the steering wheel 110 being in the path, the image may not be fully captured by the infrared camera 140. Thus, the implementation of the system depicted in FIG. 1 may be frustrated.

Figure 2:
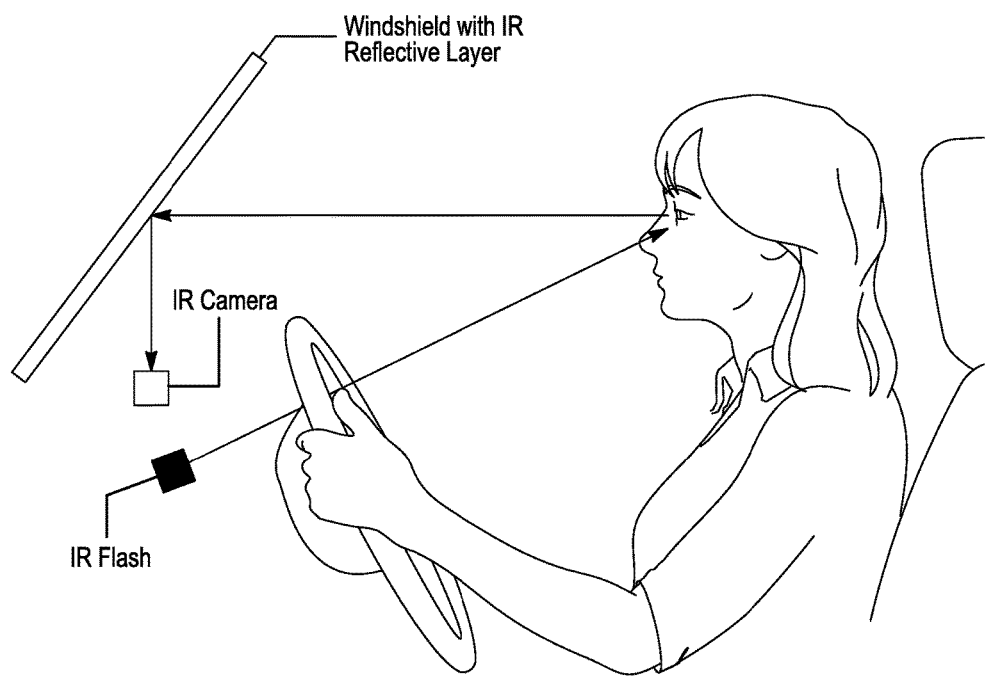
FIG. 2 is an example of a system for monitoring a driver of a vehicle.

FIG. 2 is an example of a system 200 for monitoring a driver 100 of a vehicle. Referring to FIG. 2, a diagram of a front seat of the vehicle is depicted. The front seat shows a steering wheel 110, a dashboard 120, an infrared flash 130, and an infrared camera 140. The infrared flash 130 and the infrared camera 140 may be situated within the dashboard 120, or relatively near the dashboard 120. The infrared camera 140 may be attached to the dashboard 120 with an attachment unit (not shown), and may be adjustable so that a lens of the infrared camera 140 is oriented at different directions.

Also shown in FIG. 2 is a windshield 210 with an infrared reflective layer 220. The infrared reflective layer 220 is a see-through film that allows visible light to pass through, but reflects infrared light. Thus, with the infrared reflective layer 220 implemented with a windshield 210, the driver 100 may operate the vehicle in a standard manner without the driver's 100 view being obstructed.

As shown in FIG. 2, the infrared flash 130 directs an infrared beam 135 to the driver 100. In turn a reflection 245 is generated, and directed towards the infrared reflective layer 220. The reflection 245 reflects off the infrared reflective layer 220 and gets reflected to the infrared camera 140. The lens (not shown) of the infrared camera 140 may be situated to receive the reflection 245. For example, as shown in FIG. 2 the infrared camera's 140 lens may be oriented significantly at the direction of the windshield 210. Thus, by implementing system 200, the image captured by the infrared camera 140 is not interfered by the steering wheel 120.

Figure 3:
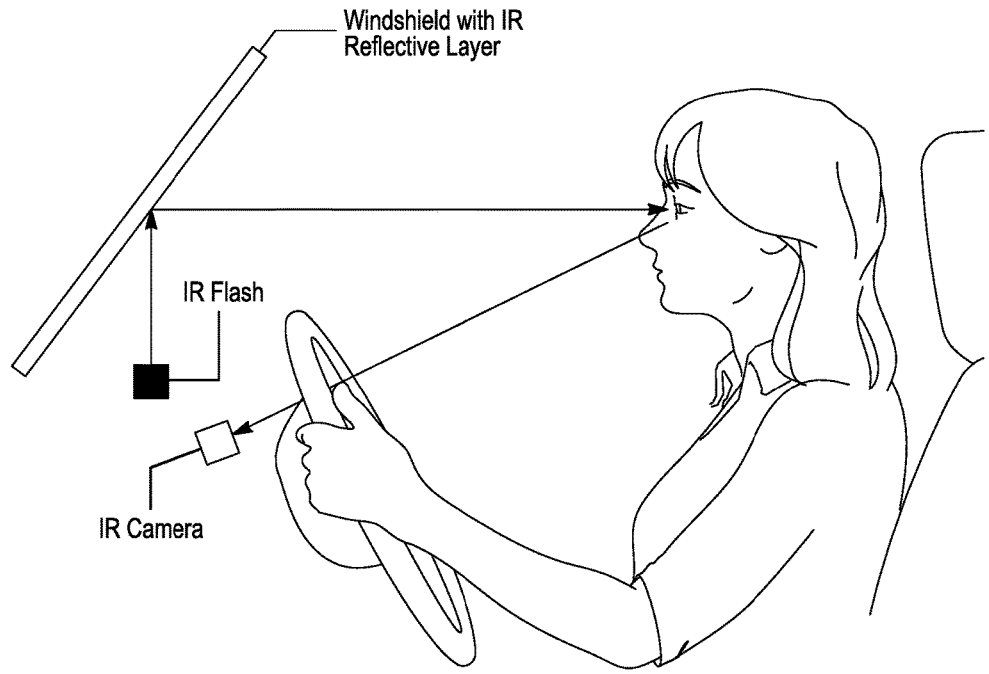
FIG. 3 is an example of a system for monitoring a driver of a vehicle.

FIG. 3 is an example of a system 300 for monitoring a driver 100 of a vehicle. Referring to FIG. 3, a diagram of a front seat of the vehicle is depicted. The front seat shows a steering wheel 110, a dashboard 120, an infrared flash 130, and an infrared camera 140. The infrared flash 130 and the infrared camera 140 may be situated within the dashboard 120, or relatively near the dashboard 120. The infrared camera 140 may be attached to the dashboard 120 with an attachment unit (not shown), and may be adjustable so that a lens of the infrared camera 140 is oriented at different directions.

Also shown in FIG. 3 is a windshield 210 with an infrared reflective layer 220. The infrared reflective layer 220 is a see-through film that allows visible light to pass through, but reflects infrared light. Thus, with the infrared reflective layer 220 implemented with a windshield 210, the driver 100 may operate the vehicle in a standard manner without the driver's 100 view being obstructed.

As shown in FIG. 3, the infrared flash 130 directs an infrared beam 335 in the direction of the windshield 210. The infrared beam 335 is subsequently reflected off the infrared reflective layer 220 in the direction of the driver 100. In turn a reflection 145 is generated, and directed towards the infrared camera 140. Thus, by implementing system 300, the infrared beam 335 is not obstructed by the steering wheel 120.

Figure 4:
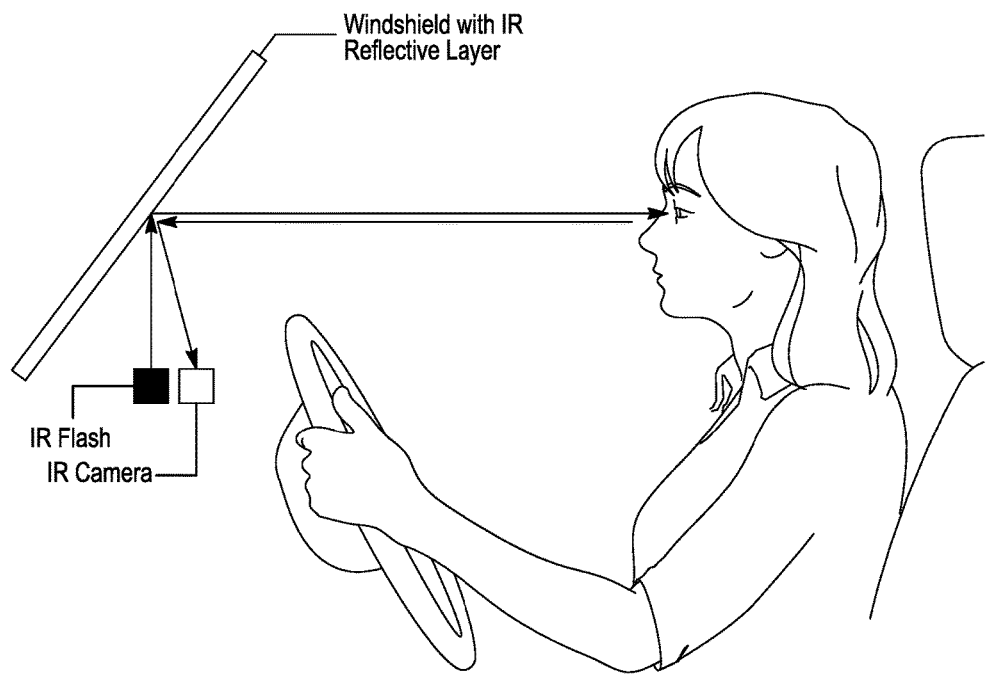
FIG. 4 is an example of a system for monitoring a driver of a vehicle.

FIG. 4 is an example of a system 400 for monitoring a driver 100 of a vehicle. Referring to FIG. 4, a diagram of a front seat of the vehicle is depicted. The front seat shows a steering wheel 110, a dashboard 120, an infrared flash 130, and an infrared camera 140. The infrared flash 130 and the infrared camera 140 may be situated within the dashboard 120, or relatively near the dashboard 120. The infrared camera 140 may be attached to the dashboard 120 with an attachment unit (not shown), and may be adjustable so that a lens of the infrared camera 140 is oriented at different directions.

Also shown in FIG. 4 is a windshield 210 with an infrared reflective layer 220. The infrared reflective layer 220 is a see-through film that allows visible light to pass through, but reflects infrared light. Thus, with the infrared reflective layer 220 implemented with a windshield, the driver 100 may operate the vehicle in a standard manner without the driver's 100 view being obstructed.

As shown in FIG. 4, the infrared flash 130 directs an infrared beam 335 in the direction of the windshield 210. The infrared beam 335 is subsequently reflected off the infrared reflective layer 220 in the direction of the driver 100. In turn a reflection 245 is generated, and directed towards the infrared camera 140. The lens (not shown) of the infrared camera 140 may be situated to receive the reflection 245. For example, as shown in FIG. 4 the infrared camera's 140 lens may be oriented significantly at the direction of the windshield 210. Thus, by implementing system 400, the image captured by the infrared camera 140 is not interfered by the steering wheel 120.

Figure 5:
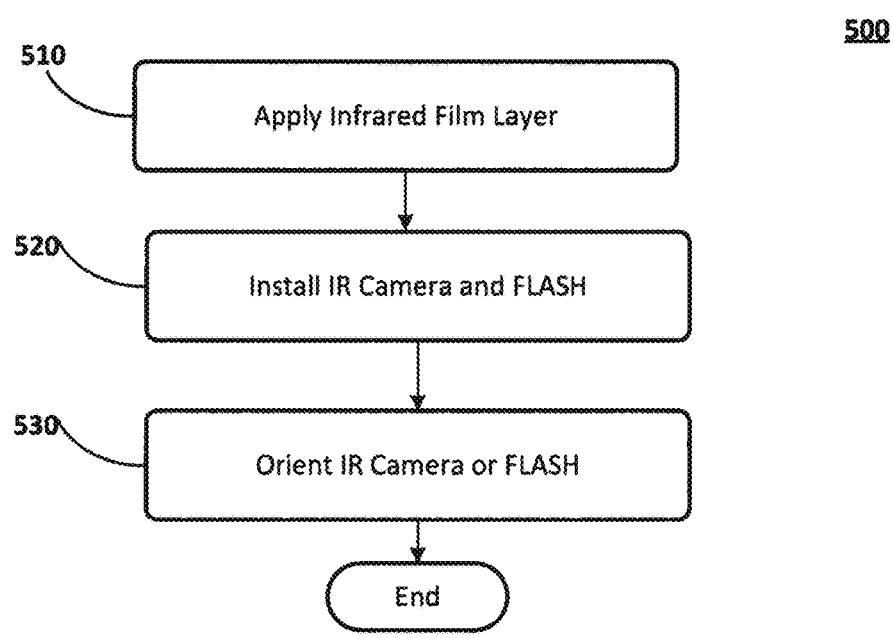
FIG. 5 is an example of a method for implementing a driver monitoring system.

FIG. 5 is an example of a method 500 for implementing a driver monitoring system. The method 500 may be incorporated as a manufacturing process, or implemented in an after-market installation in a vehicle.

In operation 510, a reflective infrared film layer is applied onto a windshield of the vehicle. The reflective infrared film layer is reflective toward infrared light, but allows visible light to pass-through.

In operation 520, the infrared camera and the infrared flash are installed in or around a dashboard of the vehicle.

In operation 530, an infrared camera or an infrared flash is oriented in the direction of the windshield. In an alternate implementation, both the infrared flash and the infrared camera are oriented in the direction of the windshield. In either case, either the reflection of the driver or the flash is not impeded by a steering wheel.

Accordingly, an implementer of the systems and methods disclosed herein may effectively capture an image or video of a vehicle's driver. Thus, by implementing any of the systems 200, 300, or 400—the steering wheel or other impediments in a vehicle area do not obstruct an image of the driver.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for monitoring a driver of a vehicle, comprising:
an infrared flash to beam an infrared light at the driver;

an infrared camera to capture an image illuminated by the beam, including reflections; and
a reflective infrared film incorporated into a windshield of the vehicle,
wherein the infrared flash is attached to a dashboard and in between a steering wheel and the dashboard and aimed upwardly toward the windshield, and the infrared flash is configured to beam the infrared light at the driver by first reflecting the light off the reflective infrared film, and the infrared camera is also located between the steering wheel and the dashboard, and is configured to detect the reflections of the driver after being reflected off the reflective infrared film.

2. The system according to claim 1, wherein the infrared camera is employed with a driver alertness detection system.

3. The system according to claim 1, wherein the infrared camera is employed with an interface device.

4. The system according to claim 1, wherein the infrared camera lens is aimed upwardly toward the windshield.

5. The system according to claim 1, wherein the infrared camera is configured to detect the infrared light reflected from the driver at a wavelength of 700 nm to 1000 nm.

6. The system according to claim 1, wherein upward is defined as perpendicular to a surface of the dashboard in between the steering wheel and windshield.

7. The system according to claim 1, wherein the infrared camera and the infrared flash are adjacent to each other.

8. The system according to claim 1, wherein the infrared camera is oriented to capture a hand gesture.

9. The system according to claim 1, wherein reflective infrared film is a see-through film that allows visible light to pass through, but reflects infrared light.

10. An infrared camera device, the device comprising:
an attachment unit to attach to a dashboard of a vehicle, and in between the dashboard and a steering wheel of the vehicle;
an infrared camera lens to capture a reflection of a driver of the vehicle,
the vehicle includes an infrared flash, and in response to the infrared flash generating an infrared light, the reflection of the driver is generated,
the infrared flash is attached to the dashboard and in between the dashboard and a steering wheel and aimed upwardly toward the windshield, and
the infrared flash is configured to project the infrared light first off the windshield before being propagated to the driver.

11. The device according to claim 10, wherein an infrared reflective layer is included in the fabrication of the windshield.

12. The device according to claim 10, wherein the attachment unit's angle relative to the dashboard is adjustable.

13. The device according to claim 10, wherein the infrared camera lens is aimed upwardly toward the windshield.

14. The device according to claim 10, wherein the infrared camera lens is aimed at an acute angle relative to horizontal toward the driver.

15. A system for monitoring a driver of a vehicle, comprising:
an infrared flash to beam an infrared light at the driver;
an infrared camera to capture an image illuminated by the beam, including reflections; and
a reflective infrared film incorporated into a windshield of the vehicle,
wherein the infrared flash is attached to a dashboard and in between a steering wheel and the dashboard and aimed at an acute angle relative to horizontal toward the driver, and the infrared flash is configured to beam the infrared light at the driver directly,
and the infrared camera is also located between the steering wheel and the dashboard and aimed upwardly toward the windshield, and is configured to detect the reflections of the driver after being reflected off the reflective infrared film.

\* \* \* \* \*